(12) United States Patent
Price et al.

(10) Patent No.: US 11,235,867 B2
(45) Date of Patent: Feb. 1, 2022

(54) AIRCRAFT LANDING GEAR ASSEMBLY

(71) Applicants: Safran Landing Systems UK LTD, Gloucester (GB); Safran Landing Systems, Vélizy-Villacoublay (FR)

(72) Inventors: Neil Price, Gloucester (GB); Marie Coq, Gloucester (GB)

(73) Assignees: Safran Landing Systems UK LTD; Safran Landing Systems

( * ) Notice: Subject to any disclaimer, the term of this patent is extended or adjusted under 35 U.S.C. 154(b) by 339 days.

(21) Appl. No.: 16/511,579

(22) Filed: Jul. 15, 2019

(65) Prior Publication Data

US 2020/0017201 A1 Jan. 16, 2020

(30) Foreign Application Priority Data

Jul. 16, 2018 (EP) .................................... 18183607

(51) Int. Cl.
*B64C 25/42* (2006.01)
*G01L 5/28* (2006.01)

(52) U.S. Cl.
CPC ................ *B64C 25/42* (2013.01); *G01L 5/28* (2013.01)

(58) Field of Classification Search
CPC ....... B64C 25/42; B64C 25/44; B64C 25/445; B64C 25/46
See application file for complete search history.

(56) References Cited

U.S. PATENT DOCUMENTS

| 4,129,202 A | 12/1978 | Winters et al. |
| 4,296,897 A | 10/1981 | Thompson |
| 4,412,291 A | 10/1983 | Amberg et al. |
| 4,474,060 A | 10/1984 | Crossman |
| 4,723,637 A | 2/1988 | Thompson, Sr. |
| 5,146,408 A | 9/1992 | Valentic |
| 5,330,034 A | 7/1994 | Rancourt et al. |
| 5,700,072 A | 12/1997 | Cook et al. |

(Continued)

FOREIGN PATENT DOCUMENTS

| DE | 102016005572 A1 | 11/2017 |
| EP | 0227574 A2 | 7/1987 |

(Continued)

OTHER PUBLICATIONS

European Examination Report for European Application No. 18183607.3, dated Sep. 12, 2019, 4 pages.

(Continued)

*Primary Examiner* — Richard G Davis
(74) *Attorney, Agent, or Firm* — RatnerPrestia

(57) ABSTRACT

An aircraft landing gear assembly comprising: an axle having an axis, a wheel rotatably mounted on the axle to rotate about the axis, a brake arranged to selectively exert a braking torque on the wheel about the axis, a brake anchor structure having a substantially fixed position relative to the axle, a brake reaction linkage that mechanically couples the brake to the brake anchor structure, and a sensor comprising a sensor element arranged to detect a change in one or more physical properties of a component of the brake reaction linkage in order to determine a stress in the component due to the braking torque, wherein the sensor element does not contact the component.

17 Claims, 5 Drawing Sheets

(56) References Cited

U.S. PATENT DOCUMENTS

| | | | |
|---|---|---|---|
| 5,705,810 A * | 1/1998 | Wang | G01B 11/16 |
| | | | 250/231.1 |
| 6,003,641 A | 12/1999 | Boehringer et al. | |
| 6,036,285 A | 3/2000 | Murphy | |
| 6,650,405 B2 * | 11/2003 | Lam | G01B 11/18 |
| | | | 356/32 |
| 7,104,616 B2 | 9/2006 | Zierolf | |
| 7,578,199 B2 * | 8/2009 | Giazotto | B64C 25/58 |
| | | | 73/800 |
| 7,677,117 B2 | 3/2010 | Perriard et al. | |
| 7,683,274 B2 | 3/2010 | Dellac | |
| 8,857,271 B2 * | 10/2014 | Tilman | G01L 5/28 |
| | | | 73/862.045 |
| 11,118,620 B2 * | 9/2021 | Whittle | B64C 25/42 |
| 2007/0228825 A1 * | 10/2007 | Perriard | B64C 25/42 |
| | | | 303/191 |
| 2008/0041141 A1 * | 2/2008 | Discenzo | G01L 1/241 |
| | | | 73/66 |
| 2008/0092641 A1 * | 4/2008 | Cahill | B60T 8/52 |
| | | | 73/121 |
| 2008/0202865 A1 * | 8/2008 | Pradier | F16D 55/36 |
| | | | 188/1.11 W |
| 2009/0229926 A1 | 9/2009 | Schaefer | |
| 2010/0106347 A1 * | 4/2010 | Cahill | B64C 25/44 |
| | | | 701/3 |
| 2010/0207613 A1 | 8/2010 | Erickson et al. | |
| 2013/0144489 A1 * | 6/2013 | Galasso | B60G 17/06 |
| | | | 701/37 |
| 2016/0281808 A1 * | 9/2016 | Lamkin | G01N 27/72 |
| 2019/0308261 A1 * | 10/2019 | Myrfield, Jr. | B27B 7/04 |
| 2020/0189553 A1 * | 6/2020 | Spiesmacher | B64C 25/42 |

FOREIGN PATENT DOCUMENTS

| | | |
|---|---|---|
| EP | 2899081 A2 | 7/2015 |
| EP | 3072763 A1 | 9/2016 |
| WO | 2005022098 A1 | 3/2005 |

OTHER PUBLICATIONS

European Examination Report for European Application No. 18183607. 3, dated Jan. 14, 2019, 6 pages.

Extended European Search Report for European Application No. 18 183 607.3, dated Sep. 10, 2018—7 pages.

* cited by examiner

AIRCRAFT LANDING GEAR ASSEMBLY

This application claims the benefit of and priority to European Application EP 18183607.3, filed on Jul. 16, 2018, the contents of which are incorporated herein by reference.

BACKGROUND OF THE INVENTION

Aircraft landing gear are known to encounter a wide range of harsh environmental conditions.

It is known to provide a disc brake assembly to apply a braking torque to each wheel assembly of an aircraft landing gear. One or more brake discs are mounted in a parallel, interleaving relationship with respect to one or more wheel disc rotors, forming a brake stack. A piston assembly can be actuated to force the brake discs axially against the wheel disc rotors to apply a braking torque to the wheel assembly.

The present inventors have identified that the weight of an aircraft landing gear assembly can be reduced and/or reliability increased in comparison to known assemblies.

SUMMARY OF THE INVENTION

According to a first aspect of the invention there is provided an aircraft assembly according to claim 1.

The present inventors have identified that a predetermined level of braking actuation can result in a different level of braking torque dependent on the temperature of the brake, the aircraft speed and/or the level of brake wear. Carbon brakes in particular can be affected by this. Therefore, known landing gear are designed in order to withstand a braking torque in excess of that which is necessary for reducing the speed of an aircraft. An aircraft landing gear according to the first aspect provides a brake torque measurement sensor that can reliably measure a level of brake torque applied to the wheel assembly, which can enable the components of the landing gear to be reduced in size and weight. The sensor can be lightweight and arranged to operate in a non-contact manner so as to improve long-term reliability.

The sensor element not contacting the component can mean that no force is transmitted between the sensor element and the component, with the sensor element observing the component in a manner which has substantially no effect on the component. This is distinct from a strain gauge, which must be elastically deformed by a force transmitted by the component in order for a stress to be determined. Overall, the sensor element is not deformed due to deformation of the component.

Furthermore, as the sensor element does not need to be bonded to the component, unlike a strain-gauge, the robustness and life of the sensor is improved, as the risk of the bond failing is reduced.

The sensor element may be arranged to convert a physical parameter, such as magnetic field strength or deflection of a component to an electrical signal.

The sensor element may also be an optical device, such as a light transducer.

The sensor can be arranged outside the component.

With such an arrangement, there is provided a landing gear assembly including a brake torque measurement sensor which can be easily implemented on a landing gear, including retrofitting to an in-service landing gear.

The component can be a torque tube and the sensor can be arranged to observe a radially inner or radially outer surface of the torque tube. With such an arrangement, the sensor can monitor the torque tube without being integrated within the torque tube. Put another way, the sensor is applied to an existing outer surface of the torque tube rather than requiring a sensor-specific feature of the component such as a recess to be provided for operation of the sensor. Thus, reference to the sensor being located "outside" the component when the component is a torque tube, the term "outside" is intended to differentiate between the sensor being integrated within the component or not. The term "outside" includes the area enclosed by the tube as well as the area radially outside the tube. It does not include the sensor being located in a dedicated passage, for example one drilled into the tube.

When the sensor is arranged on a radially outer surface of the torque tube, larger axles can be accommodated by the torque tube.

The component can be a flanged adapter arranged to mechanically couple a brake housing of the landing gear to the axle. With such an arrangement, the braking torque can be accurately measured.

The flanged adapter can be a spoked flanged adapter. With such an arrangement, the flanged adapter may deform further for a given torque, making it more suitable for use with sensors measuring deflection, such as an optical sensor.

It is understood that, under braking, the component will transmit the brake torque to the brake housing and landing gear structure. Therefore the component will be subjected to a stress such as torsional stress. By measuring any of the physical properties of the component that change as a result of the stress, it will be possible to determine the torque that occurs as a result of applying the brakes. The physical properties observed within the component could be a change in magnetic properties or deflection of various magnitudes depending on the stiffness of the component.

BRIEF DESCRIPTION OF THE DRAWINGS

Embodiments of the invention will now be described with reference to the accompanying drawings, in which.

DETAILED DESCRIPTION OF EMBODIMENTS

Figure 1:
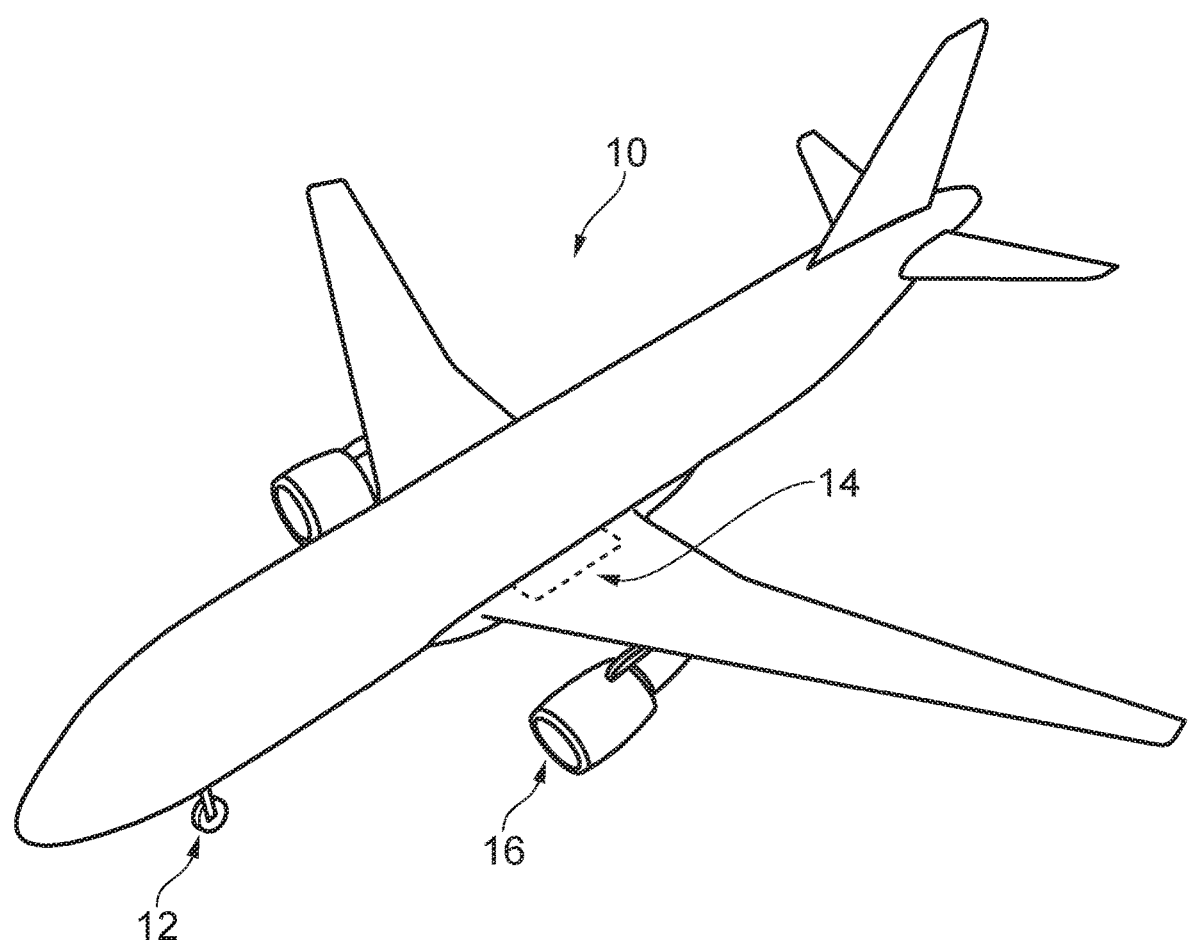
FIG. 1 is a diagram of an aircraft according to an embodiment of the invention.

FIG. 1 is a diagram of an aircraft 10. The aircraft 10 includes assemblies such as a nose landing gear 12, main landing gear 14 and engines 16. Other aircraft assemblies will be apparent to the skilled person. An aircraft assembly can be a group of interconnected parts which are arranged to be fitted to one or more other aircraft assemblies as a unit. The term aircraft as used herein includes aeroplanes, helicopters, UAVs and the like.

Figure 2:
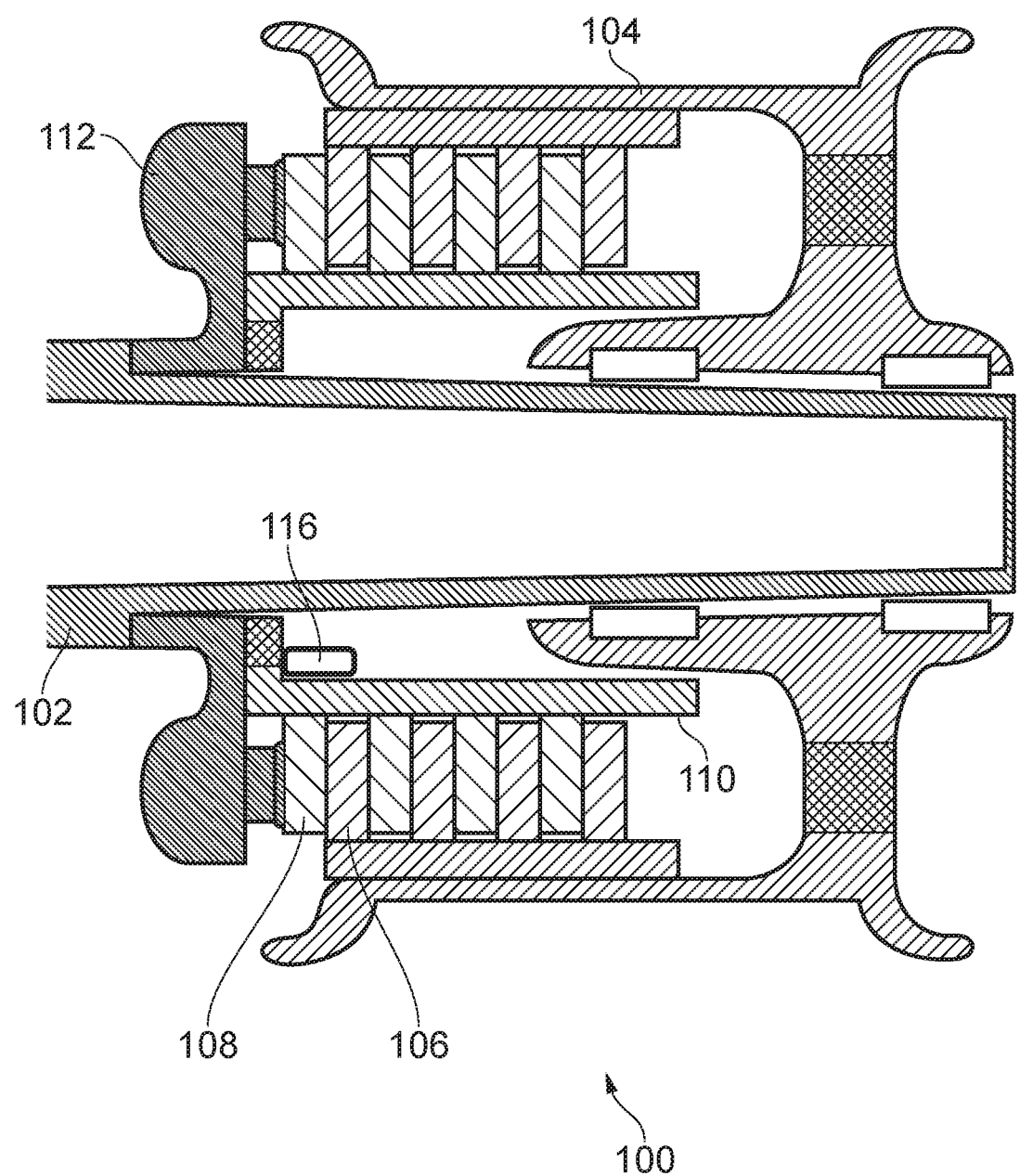
FIG. 2 is a schematic cross sectional view of a braking assembly according to an embodiment of the invention.

FIG. 2 shows a landing gear brake assembly 100. The brake assembly 100 is mounted on an axle 102 of the landing gear and is operable to exert a braking torque on a wheel 104 mounted on the axle 102. In the arrangement shown in FIG. 2, the axle 102 does not rotate and the wheel 104 is mounted on the axle via bearings (not labelled) so that it can rotate relative to the axle 102.

The brake assembly 100 is operated by an actuating cylinder arranged within the brake housing 112. The actuating cylinder acts to force together a stack of brake discs. The stack of brake discs is formed of a set of brake stator discs 108, mounted on a torque tube 110, alternating in an interleaving fashion with a set of wheel rotor discs 106, which are connected to the wheel 104.

When the brake is actuated, the stator discs 108 engage with the rotor discs 106. The frictional force between the discs means that a torque is exerted on the wheel 104, which slows the rotation of the wheel 104.

The equal and opposition reaction to the braking torque exerted on the wheel 104 via the rotor discs 106 is a torque in the direction of motion of the wheel 104 on the stator discs 108. The stator discs 108 are anchored in the torque tube 110. The torque tube 110 is rigidly connected to the axle 102 and the brake housing 112. In some arrangements, the torque exerted on the torque tube 110 can be balanced by a brake rod (see FIG. 5).

The above components, which are affected by the braking torque, can be referred to as being in the "load path" of the braking torque. It will be understood that each component in the load path can elastically deform due to the torque applied. The stress in any one of the components in the load path in response to a specific braking torque is proportional to the braking torque.

Thus, in order to determine the braking torque, a non-contact sensor 116 is used to determine the torsional stress in the torque tube 110. In particular, the non-contact sensor 116 determines torsional stress at an end of the torque tube 110 proximate the brake housing 112, since this end of the torque tube 110 will be subjected to the full braking torque, regardless of which of the stator discs 108 or rotor discs 106 is applying what proportion of the braking torque. The non-contact sensor 116 can be arranged such that no stator discs 108 connect to the torque tube 110 between the point on the torque tube 110 observed by the non-contact sensor 116 and the brake housing 112.

When torsional stress in the torque tube 110 is to be measured, the non-contact sensor 116 can be arranged to observe either the outer surface of the torque tube 110 or the inner surface of the torque tube 110. By placing the non-contact sensor 116 on the outer surface of the torque tube 110, there is more space allowed for larger axles.

In either case, since the non-contact sensor 116 is exterior to the torque tube, a non-contact sensor can be included in a brake assembly with minimal structural interference.

The non-contact sensor 116 can be mounted on a bracket (not shown), which is adjacent to the torque tube 110 and connected to the brake housing 112 and/or the flanged adapter 114.

Figure 3:
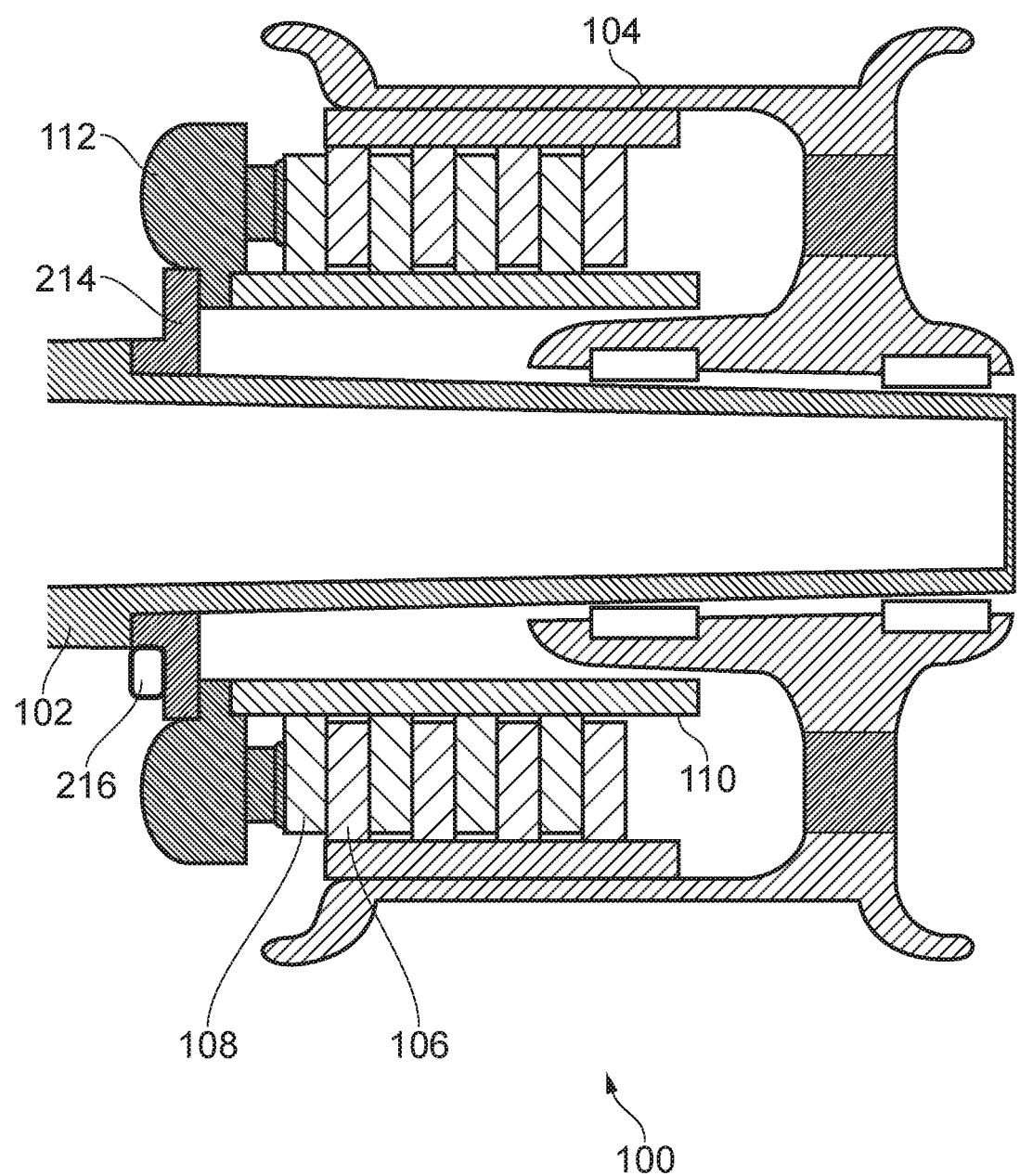
FIG. 3 is a schematic cross sectional view of an alternative braking assembly according to an embodiment of the invention.

Alternatively, as shown in FIG. 3, the torque tube 110 can be rigidly connected to a flanged adapter 214, which is connected to the axle 102 and the brake housing 112. The load path can pass from the torque tube 110 to the axle 102 via the flanged adapter 214.

A non-contact sensor 216 can be arranged to determine the torsional stress in the flanged adapter 214, which is connected to the brake housing 112 and torque tube 110.

Figure 4C:
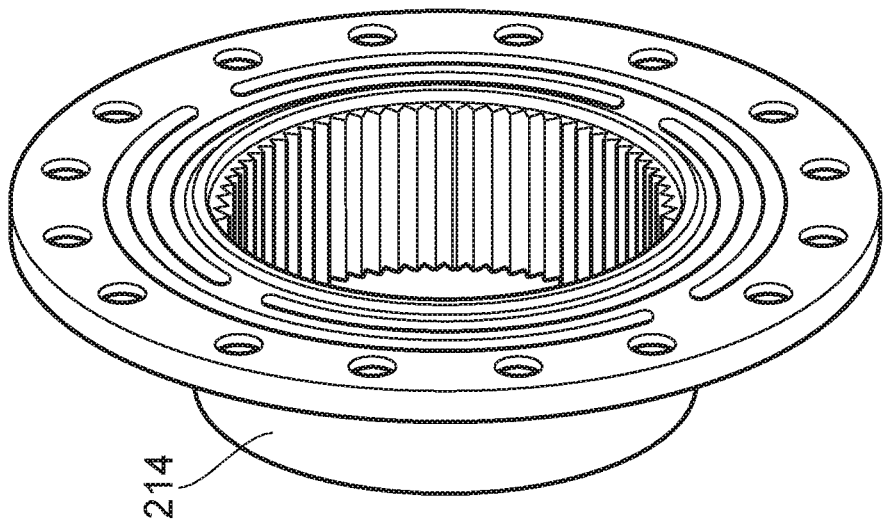
FIGS. 4a to 4c are views of different flanged adapters.
Figure 4B:
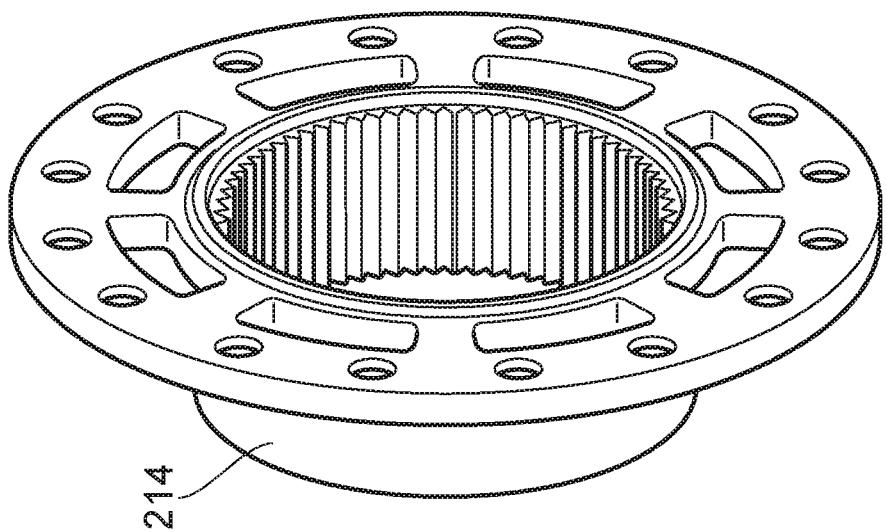
Figure 4A:
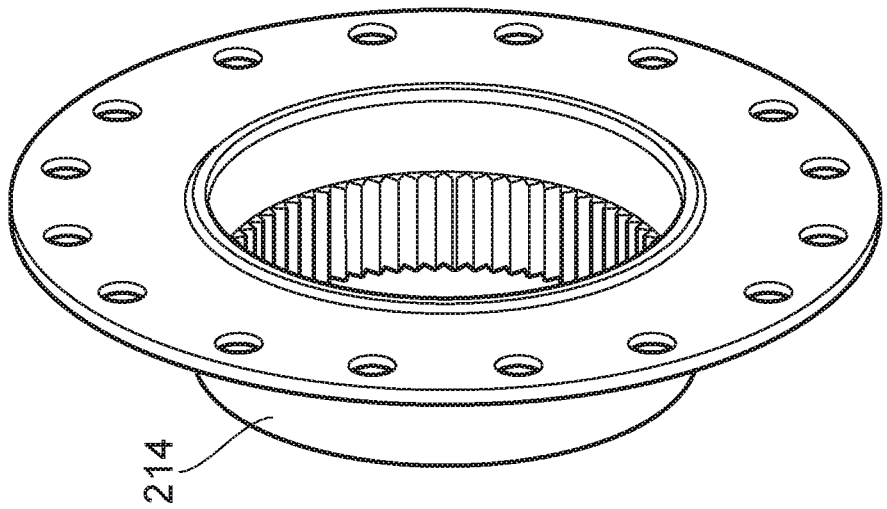

A solid flanged adapter, such as that shown in FIG. 4*a*, can be used in order to provide structural stiffness to the brake assembly.

When stress in the flanged adapter 214 is to be measured, it may be advantageous to use a flanged adapter 214 which will deflect a significant amount in response to an applied torque. Such a flanged adapter 214 can be referred to as a spoked adapter. FIG. 4*b* shows a spoked adapter in which spokes connect an inner ring of the flanged adapter, which can connect to the axle 102, to an outer ring of the flanged adapter, which can connect to the brake housing and the torque tube.

A spoked adapter having an intermediate ring between the outer circumference of the flange and an inner hub can also be used, the intermediate ring connected by spokes to both of the outer circumference and the inner hub, the spokes being discontinuous across the inner ring. Such an adapter will be referred to as a sprung flanged adapter. A spoked adapter is shown in FIG. 4*c*.

The non-contact sensor 216 can be arranged either on a face of the flanged adapter 214 which is perpendicular to the axle 102, and used to connect to the brake housing 112, or on a face of the flanged adapter 214 parallel to the axle 102 and used to connect to the axle, via either a splined or bolted connection.

Figure 5:
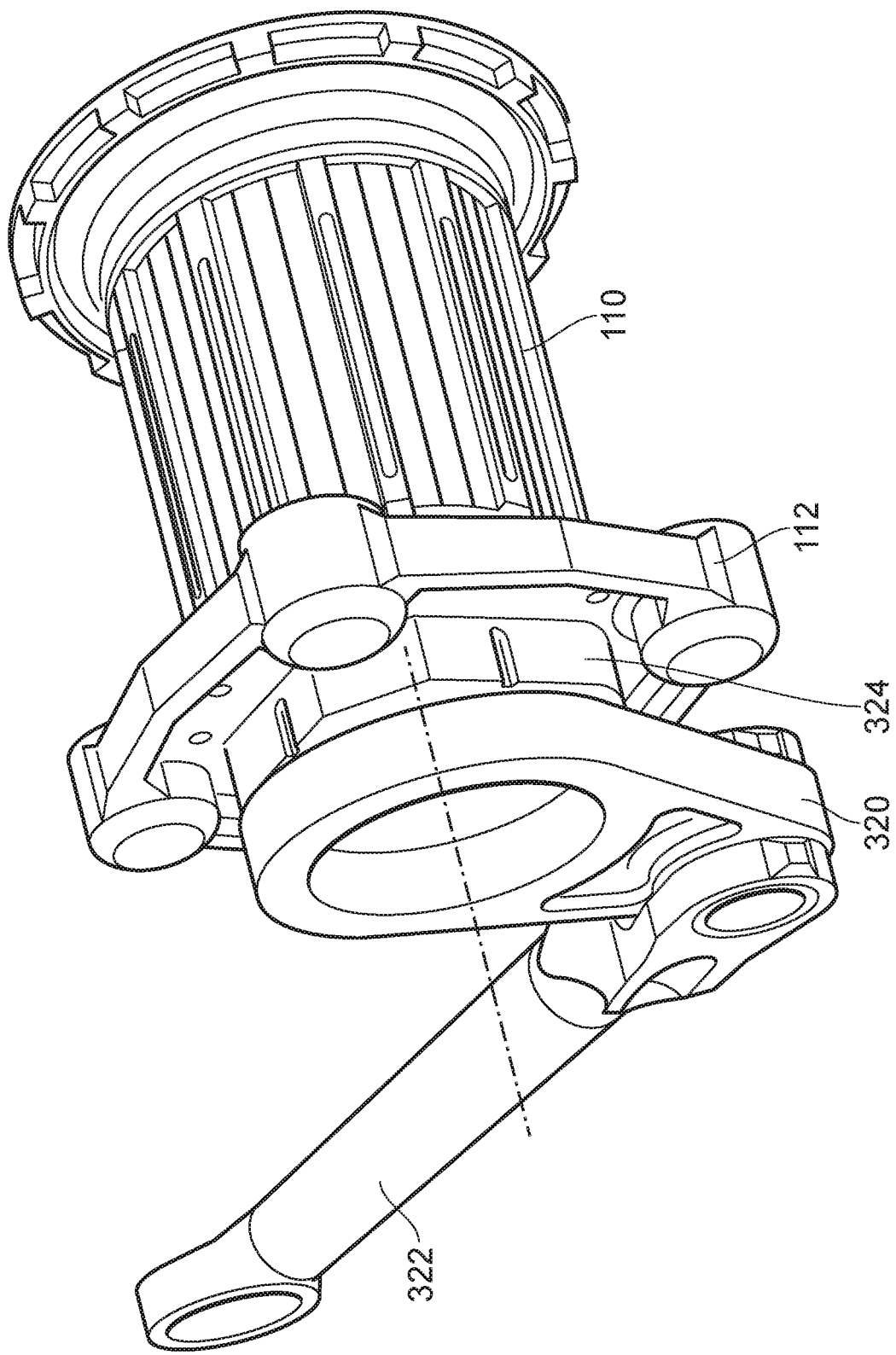
FIG. 5 is an external view of a further alternative braking assembly according to an embodiment of the invention.

FIG. 5 shows an external view of part of the brake assembly. In the arrangement shown in FIG. 5, the braking torque is balanced by a brake rod 322, which is coupled to the brake housing 112 via a lever arm 320.

In the arrangement shown in FIG. 5, the magnitude of the braking torque can be measured by a non-contact sensor arranged within a sensor housing 324. The non-contact sensor arranged within the sensor housing 324 is arranged to measure deformation of the flanged adapter 214.

Alternatively, a non-contact load sensor can be integrated within a torque pin (not shown) which connects the brake housing 112 to the brake rod 322. This can be achieved by measuring physical properties of the pin that change when subjected to a force, such as magnetic properties or deflection.

Embodiments of the invention can include various non-contact sensors, either mounted externally with respect to a component to be monitored or mounted within a sensor specific mounting formation such as a bore.

For example, a non-contact sensor can comprise a sensor arranged to detect eddy currents within the component. Eddy currents may be detected by their associated magnetic fields. The magnetic fields can be detected by devices known as Foucault current sensors. By detecting the strength of the eddy currents, the distance between the sensor and the component can be determined. Thus, the deformation of the component can be determined.

Alternatively, a non-contact sensor can comprise a sensor arranged to detect magnetic fields within the component. The magnetic fields can be detected by devices known as flux-gate sensors. A change in torsional stress will result in a change of magnetic field strength direction and magnitude.

In another example, the sensor can comprise of a sensor element that can detect deflection within the component using reflected light and evaluating the changes between the sent and received light.

In another example, the sensor can comprise a vision based system arranged to observe an exterior surface of the component to determine deformation of the component. The system can for example be arranged to monitor movement of a feature such as a dot on the exterior surface due to deformation of the component.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
an axle having an axis;
a wheel rotatably mounted on the axle to rotate about the axis;
a brake arranged to selectively exert a braking torque on the wheel about the axis;
a brake anchor structure comprising a first structural component of the aircraft landing gear assembly which is arranged so as to have a substantially fixed position relative to the axle;
a brake reaction linkage comprising one or more second structural components of the aircraft landing gear assembly that mechanically couple the brake to the brake anchor structure such that the one or more second structural components react the braking torque; and
a sensor comprising a sensor element arranged and configured to detect a change in one or more physical properties of at least one of the second structural components of the brake reaction linkage in order to determine a stress in the at least one of the second structural components due to the braking torque, wherein the sensor element does not contact the component, and wherein the sensor element is arranged and configured to directly observe the at least one of the second structural components of the brake reaction linkage in order to detect the change in one or more physical properties of the at least one of the second structural components of the brake reaction linkage.

2. The landing gear assembly of claim 1, wherein the sensor element is configured to convert an electromagnetic property to an electrical signal.

3. The landing gear assembly of claim 2, wherein the sensor element is a light transducer.

4. The landing gear assembly of claim 2, wherein the sensor element is configured to detect a magnetic field.

5. The landing gear assembly of claim 1, wherein the sensor is an interferometer.

6. The landing gear assembly of claim 1, wherein the at least one of the second components is a torque tube, which surrounds and extends along the axle, and wherein the brake comprises stationary brake discs that are coupled to the torque tube.

7. The landing gear assembly of claim 6, wherein the sensor is arranged on a radially inner or radially outer surface of the torque tube.

8. The landing gear assembly of claim 6, wherein the sensor is arranged proximate to an end of the torque tube where the torque tube connects to a brake housing.

9. The landing gear assembly of claim 6, wherein the sensor is arranged on a bracket arranged adjacent to the torque tube.

10. The landing gear assembly of claim 1, wherein the component is a flanged adapter arranged to mechanically couple a brake housing of the landing gear to the axle, the flanged adapter extending around the axle and having an annular shape, which is L-shaped in cross section.

11. The landing gear assembly of claim 10, wherein the flanged adapter is a spoked flanged adapter, which has a plurality of spokes extending radially between the axle and the brake housing.

12. The landing gear assembly of claim 1, wherein the brake comprises a stack of brake discs.

13. The landing gear assembly of claim 12, wherein the brake discs are formed from carbon.

14. The landing gear assembly of claim 1, wherein the one or more second structural components are formed from metal.

15. The landing gear assembly of claim 1, wherein the sensor element is arranged and configured to directly observe a surface of the one or more second structural components, wherein the surface is an integral, unitary part of the one or more second structural components.

16. The landing gear assembly of claim 1, wherein the sensor element is not arranged and configured to directly observe a layer or sleeve applied to the one or more second structural components in order to detect the change in one or more physical properties of the one or more second structural components.

17. An aircraft including one or more landing gear assemblies, each landing gear assembly comprising:
an axle having an axis,
a wheel rotatably mounted on the axle to rotate about the axis,
a brake arranged to selectively exert a braking torque on the wheel about the axis,
a brake anchor structure comprising a first structural component of the aircraft landing gear assembly which is arranged so as to have a substantially fixed position relative to the axle,
a brake reaction linkage comprising one or more second structural components of the aircraft landing gear assembly that mechanically couple the brake to the brake anchor structure such that the one or more second structural components react the braking torque, and
a sensor comprising a sensor element arranged and configured to detect a change in one or more physical properties of at least one of the second structural components of the brake reaction linkage in order to determine a stress in the at least one of the second structural components due to the braking torque, wherein the sensor element does not contact the component, and wherein the sensor element is arranged and configured to directly observe the at least one of the second structural components of the brake reaction linkage in order to detect the change in one or more physical properties of the at least one of the second structural components of the brake reaction linkage.

* * * * *